United States Patent [19]

Usry

[11] 4,338,969

[45] Jul. 13, 1982

[54] THROUGH FAULT PRESSURE FILTER FOR FAULT PRESSURE RELAY

[76] Inventor: Gerald O. Usry, 13 Westlyn Dr., Rome, Ga. 30161

[21] Appl. No.: 858,966

[22] Filed: Dec. 9, 1977

[51] Int. Cl.$^3$ .......... F16D 1/02

[52] U.S. Cl. .......... 138/44

[58] Field of Search .......... 138/26, 44, 40, 37; 181/248

[56] References Cited

U.S. PATENT DOCUMENTS

| | | | |
|---|---|---|---|
| 2,653,801 | 9/1953 | Fontein et al. | 138/44 |
| 2,803,962 | 8/1957 | West | 138/44 |
| 3,109,459 | 11/1963 | Lee | 138/40 |
| 3,212,521 | 10/1965 | Jean | 138/44 |
| 3,537,482 | 11/1970 | Rudewick | 138/44 |
| 3,702,144 | 11/1972 | Loveland | 138/44 |
| 3,999,714 | 12/1976 | Lang | 138/44 |

*Primary Examiner*—Lenard A. Footland

*Attorney, Agent, or Firm*—Robert A. Cahill

[57] ABSTRACT

Methods and apparatus are provided for attenuating through-fault pressure disturbances in fault relays for a liquid-filled transformer. The method comprises the interposition of a mechanical filter between the transformer and the relay for attenuating through fault pressure variations while passing internal pressure faults. The filter consists of a pressure attenuation passage having an optimum length to diameter ratio for attenuating higher frequency pressure oscillations in excess of 50 Hz.

3 Claims, 17 Drawing Figures

THROUGH FAULT PRESSURE FILTER FOR FAULT PRESSURE RELAY

BACKGROUND OF THE INVENTION

This invention relates to pressure fault relay apparatus for use with liquid-filled electrical equipment. In normal operating conditions the relay allows the electrical apparatus to function without disconnecting the electrical equipment from the electrical supply. Relays are currently available having pressure sensing mechanisms for determining pressure changes associated with internal fault conditions and for providing electrical output signals to operate disconnect controls.

When pressure relays are used with liquid filled transformers the relay must be able to differentiate between a true internal fault pressure wave and a pressure disturbance caused by through faults or faults occurring outside the electrical equipment. In order to insure that the relay operates immediately when internally created pressure disturbances occur, the pressure threshold for operating the relay is set low enough such that externally created through-fault disturbances can sometimes cause the relay to operate.

The false operation of the relay caused by through-fault pressures of a temporary nature can cause unnecessary power outages to occur that are very expensive to investigate and reconnect the equipment to the line.

The purpose of this invention is to provide a simple mechanical means for discriminating between an internal generated fault and an external generated through fault so that electrical signal indication is made for an internal fault pressure disturbance only.

U.S. Pat. No. 3,898,404 describes a sudden pressure relay having a plurality of flow restricting baffles. The relay assembly is mounted in the gas space above the liquid medium and contains a plurality of disc-shaped baffles for discriminating between sudden and between longer term thermal pressure increases.

U.S. Pat. No. 3,090,848 discloses a fluid-pressure actuated switch containing a perforated metal washer for stabilizing the relay against operating on momentary pressure fluctuations.

When perforated discs, similar to the devices disclosed in the aforementioned U.S. patent, are employed in a pressure relay for protecting liquid filled electrical equipment, the pressure becomes restricted to such an extent that in some instances the time between the pressure disturbance and relay actuation is substantially delayed. In cases where an internal fault exists, such as the type occurring when the transformer winding forms an electrical arc, substantial damage to the transformer can occur before the relay becomes actuated. A further purpose of this invention is to provide means for a fault pressure relay to be relatively undisturbed by temporary through fault pressure yet become readily actuated upon the occurrence of an internal pressure fault.

SUMMARY OF THE INVENTION

This invention comprises both methods and apparatus for discriminating between through fault pressure occurrences and internally generated pressure occurrences in liquid type fault pressure relays.

One embodiment of the invention interposes a frequency selective filter for attenuating through fault pressure disturbances and for passing internal fault pressure disturbances.

A further embodiment of the invention provides a filter between the mechanical assembly of the relay and between the transformer tank having a geometry such that the length to cross section ratio attenuates higher frequency pressure waves in excess of 50 Hz.

DESCRIPTION OF THE PREFERRED EMBODIMENT

Figure 1:
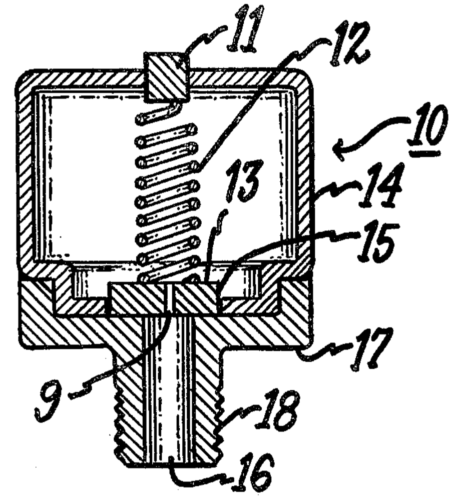
Fig. 1. PRIOR ART
FIG. 1 is a side sectional view of a typical prior art fault pressure relay.

FIG. 1 contains a typical or representative mechanically actuated fault pressure relay 10 containing an actuating member 11 connected to a diaphragm 13 by means of an adjustable spring 12. The spring-loaded diaphragm assembly is contained in an outer jacket 14 and the diaphragm 13 communicates with the pressure-actuating fluid via aperture 15. The outer jacket 14 is connected to a stem member 17 (shown separate for descriptive purposes only). The stem assembly 17 further contains an opening 16 through which the fluid to be sensed may enter into the relay 10 and contains standard male pipe thread 18 for connecting to the base of a transformer tank assembly. Diaphragm 13 contains a small hole 9 to allow fluid to flow through and equalize the pressure on both sides during normal operation. The pressure relay of FIG. 1 operates in the following manner. When a pressure disturbance is exerted upon the transformer fluid media the pressure wave enters into the opening 16 and causes the diaphragm member 13 to create a force against the spring 12. The spring 12 is preadjusted so that upon receiving a pressure impulse in excess of a threshold value the spring 12 causes the relay actuating member 11 to move and to operate some type of electric switching mechanism such as, for example, a microswitch.

Figure 2:
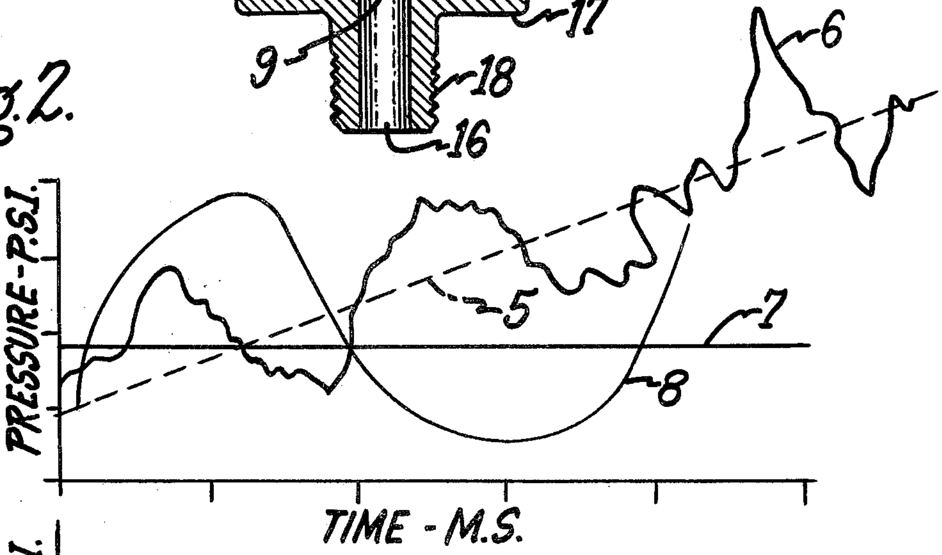
FIG. 2 is a graphic representation of a pressure disturbance as a function of time.

As shown in FIG. 2, one general type of pressure wave disturbance occurring within liquid-filled transformers is caused by an external generated electrical disturbance resulting in the pressure wave 8 which varies periodically with time with an average value unchanging as 7. The characteristic pressure waves associated with external through fault are periodic and vary from the fundamental AC power frequency up to the 6th harmonic. Therefore for the standard 60 Hz. power frequency, the pressure waves of concern would vary from 60 Hz. to 360 Hz. The other type of pressure disturbance, that is, the internal pressure fault has pressure wave 6 which is much more complex in form, and its average value increases in time indicated at 5. The internal fault is of a serious nature and is associated with a failure of the transformer whereas the through fault is associated with a fault external to the transformer and usually does not result in transformer damage. The fault pressure relay of FIG. 1 can react to both through fault and internal pressure disturbances (8, 5) such that the relay actuating member 11 can be caused to interrupt power to the transformer when a through fault pressure 8 is sufficient to overcome the pre-adjusted tension of spring 12.

This invention provides a frequency sensitive filter for attenuating the pressure disturbances having the form indicated at 8 in FIG. 2.

Figure 3:
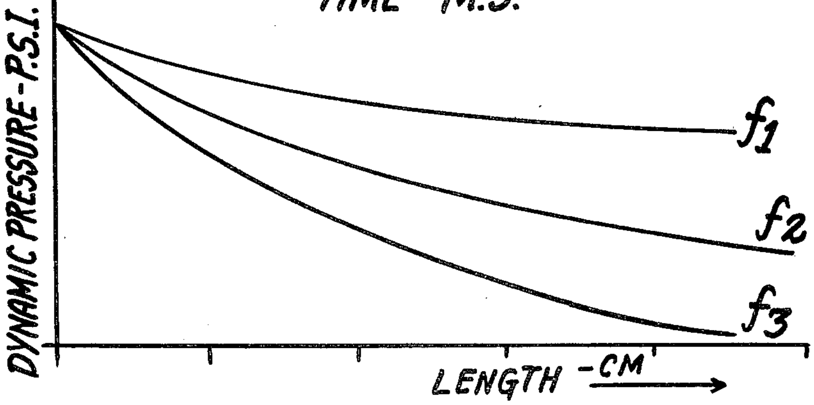
FIG. 3 is a graphic representation of the attenuation of sinusoidal pressure waves as a function of length for contours of pressure wave frequency.

FIG. 3 shows the relationship between the liquid dynamic pressure magnitude and frequency through a fixed diameter pipe having an adjustable length. When the pressure is caused to vary sinusoidally in a manner indicated for pressure wave 8 in FIG. 2 and the diameter of the transmitting pipe is held constant, the pressure wave can be attenuated for various frequencies depending upon the transit length of the pipe. FIG. 3 shows this decrease in pressure as a function of the pipe length for frequencies varying from $f_1$ equal to 50 Hz. and $f_2$, $f_3$, with increasing frequency. The invention, therefore, provides a means for attenuating pressure waves within a particular frequency range by fixing the length to diameter ratio of a passage such that frequencies associated with periodic type through fault pressures will be attenuated and the lower frequency and non periodic type pressure disturbances associated with internal faults will transmit relatively undisturbed.

Figure 4:
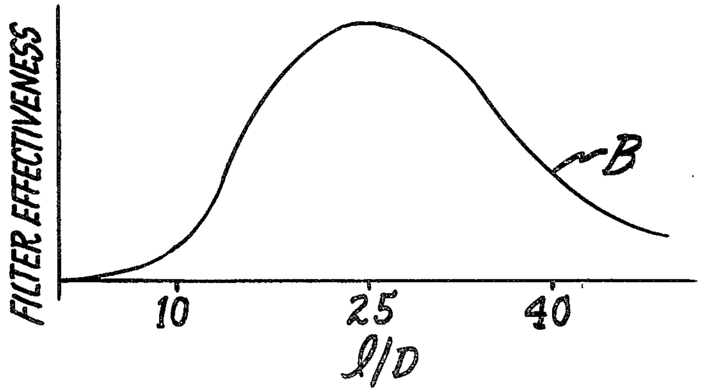
FIG. 4 is a graphic representation of the filter effectiveness as a function of the length-to-diameter ratio for the filter of this invention.

FIG. 4 is a graphical representation for the filter effectiveness expressed as the ratio of the sensitivity to internal faults to the sensitivity to through faults for a series of through-fault pressure filters having passages of differing lengths with fixed ⅛ inch diameter (I.D.). As can be seen one of the critical dimensions for optimum relay operation is the length to diameter ratio (1/D). For small (1/D) values ≦10, there is very little pressure attenuation for either internal or through fault pressure waves. Therefore, only as the (1/D) value approaches 10 does the sensitivity to through fault waves start decreasing and thus cause the effectiveness to increase. Now as the (1/D) ratio is increased further, the through fault sensitivity continues to decrease and the effectiveness continues to increase until a maximum is achieved at (1/D) of approximately 25. For (1/D) greater than approximately 25, the sensitivity to internal faults starts decreasing and thus reduces the effectiveness with further increases. The filter is partially effective over a range of (1/D) values from approximately 10 to 40. However, the optimum and maximum effectiveness is for a (1/D) ratio of approximately 25.

Figure 5A:
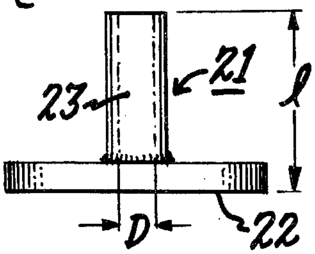
FIG. 5A is a side view of one embodiment of the filter of this invention.
Figure 5B:
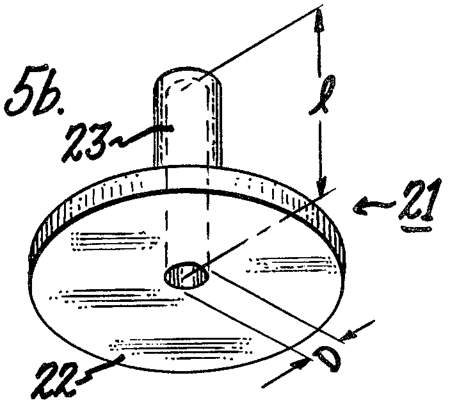
FIG. 5B is a second embodiment of the filter of this invention.
Figure 5C:
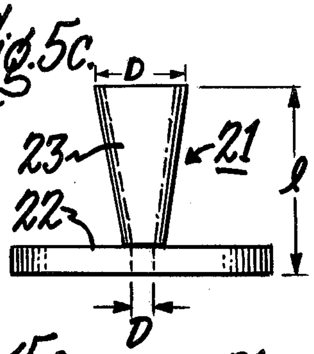
FIGS. 5C through 5F are end views of further embodiments of the filter of this invention.

An efficient filter having an 1/D ratio of 25 to 1 is shown in FIG. 5A. The filter 21 has a base portion 22 with a passage diameter D of ⅛" diameter and a stem portion 23 which, including the thickness of the base 22, has an overall length 1 as indicated. For D equal to ⅛" 1, therefore, equals 3.125 inches in order to fulfill the requirement that the ratio of 1/D equals 25 to 1. The filter of FIG. 5A is shown in a bottom perspective view in FIG. 5B where the base portion 22 is cylindrical in diameter and the stem portion 23 is a cylinder. The filter 21 of FIG. 5C has a fixed overall length 1 and a diameter varying from D at the opening in base 22 out to D' as indicated. The varying diameter shifts the filter optimum effectiveness to higher frequencies as compared to the constant diameter filter.

Figure 5D:
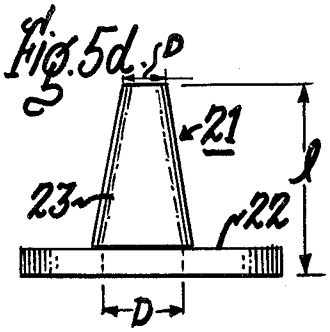

FIG. 5D shows a filter 21 having a fixed overall length 1 and a tapering stem section 23. The diameter D at the top of the stem 21 varies increasingly out to a larger diameter D' through base 22. This embodiment also provides for an optimum effectiveness at higher frequencies.

Figure 6A:
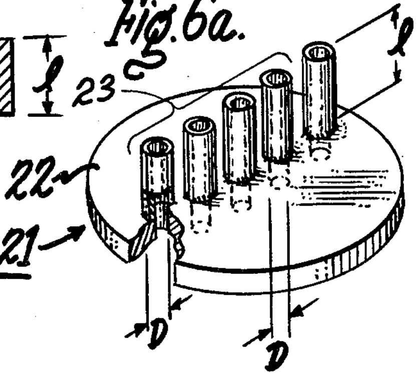
FIG. 6A is a side view of a further embodiment of the filter of this invention having a plurality of filter units.

FIG. 6A is one variation of the filter 21 of this invention having a base 22 through which there are a series of passages of diameter D as indicated, and a plurality of stems 23 having a fixed length 1.

Figure 6B:
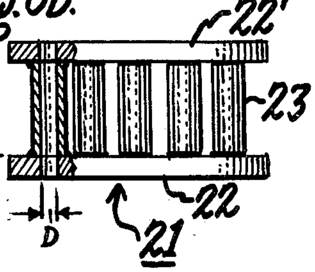
FIG. 6B is an alternate embodiment of the filter of 6A.
Figure 5E:
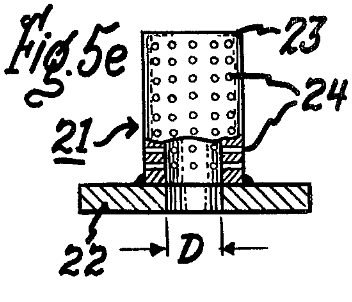

FIG. 6B is an alternate embodiment of the filter 21 of 6A having the addition of an extra base 22'.

Figure 6C:
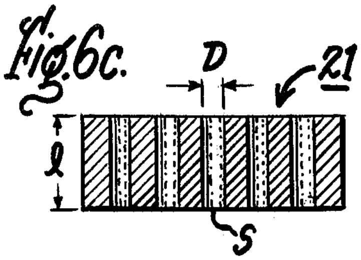
FIG. 6C is a side sectional view of the filter of this invention having a plurality of pressure attenuating passages in parallel.

FIG. 6C is a one-piece disc filter 21 where the length 1 is the thickness of the disc and the diameter D is provided by a series of passages S through the disc 21. The filter is made of a liquid impervious material such as teflon, metal or ceramic to force the oil to transmit through the pressure attenuating passages.

Figure 6D:
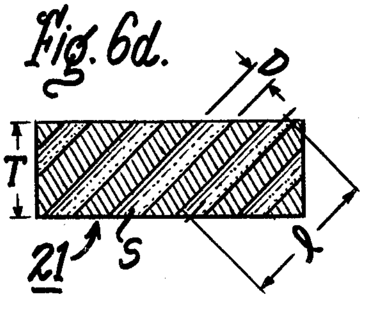
FIG. 6D is an alternate configuration of the filter of 6C.

FIG. 6D is an alternate embodiment of the filter 21 of this invention for use in applications where the thickness T must be kept at a relatively small value. In this embodiment the required length 1 is provided by a plurality of passages S each having the required diameter D as indicated. It is to be noted that for the embodiment of 6D that the D for each passage S can be of a differing diameter so that each (1/D) passage ratio be made constant.

Figure 5F:
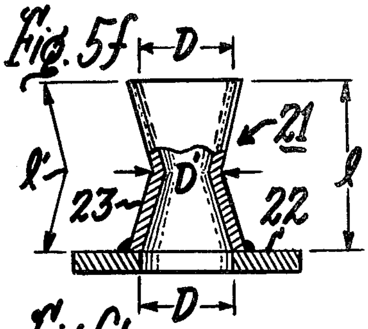
Figure 5G:
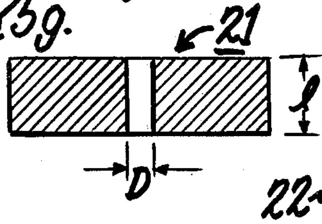
FIG. 5G is a cross-sectional view of an alternate embodiment of the filter of FIG. 5A.

FIG. 5F is an example of a variable D ranging from D at both ends to D' in the center and a variable 1 ranging from 1 close to the center and 1' near the ends of the filter 21.

Figure 7:
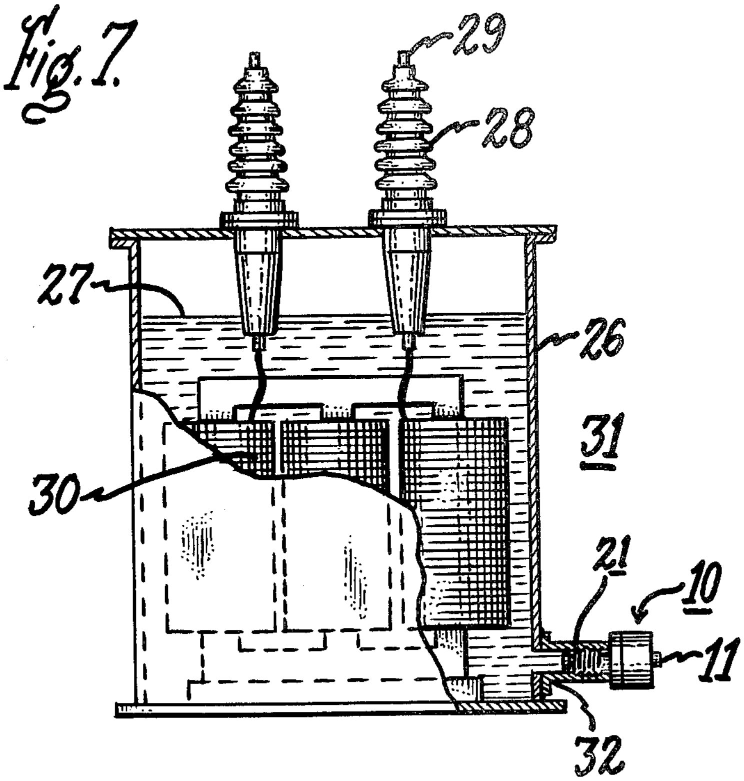
FIG. 7 is a side cutaway view of a liquid-filled transformer having a pressure-fault relay attached thereto.

FIG. 7 shows a transformer 31 having a core assembly 30 within a dielectric fluid 27 and contained in a transformer casing 26. Electrical connection is made by means of electrodes 29 passing within casing 26 by means of high voltage bushings 28. A mechanically actuated relay 10 similar for example, to the relay 10 of FIG. 1 is removably connected to the transformer casing 26 by means of a protruding stem member 32. The filter 21 of this invention is interposed between the transformer stem 32 and the mechanical relay 10 for preventing sinusoidal pressure disturbances from reaching relay 10 and causing an electrical output to occur.

Figure 8:
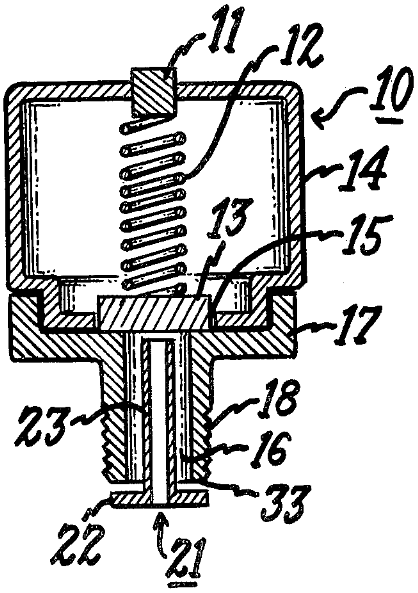
FIG. 8 is a sectional view of a mechanical fault-pressure relay containing the inventive pressure attenuating filter.

FIG. 8 shows the mechanical relay 10 of FIGS. 1 and 7 with the filter 21 of this invention. The filter 21 is inserted within the orifice 16 such that the filter stem 23 extends within the relay base 17 and the filter base 22 is retained by the end portion 33 of the relay stem 17. The filter 21 becomes mechanically attached to the transformer stem 32 when the threaded portion 18 of the relay stem 17 is screwed to transformer stem 32 as described earlier. The filter 21 can also be inserted within the transformer stem 32 if desired or formed as part of the transformer structure or the relay structure.

Prior art attempts to baffle the through fault pressure impulses within oil-filled transformer systems by using aperatured discs caused the overall sensitivity of the system to become decreased. In order to avoid a substantial decrease in the internal fault pressure waves while continuing to attenuate the through fault pressure waves the minimum cross-sectional area for adequate pressure transmission was determined. For a diameter D equal to $\frac{1}{8}''$ for the embodiment of this invention having a $\frac{1}{8}''$ diameter opening and a length 1 of 3.125″ the cross-sectional area is equal to $\pi \times x(1/16)^2$ in square inches. Since the 3.125″ length is rather cumbersome for implementing with most mechanical pressure relays a larger number of openings may be utilized having shorter lengths providing the total cross-sectional area is not less than that obtained for the single $\frac{1}{8}''$ diameter dimension. It is to be noted that the length to diameter ratio can be kept at a constant value of 25 and a plurality of filter elements can be contained in a parallel relationship providing the total cross-sectional area does not exceed the above specified unit. One large diameter unit of a fixed length or several smaller diameter subunits having shorter lengths can be employed depending upon the particular geometries involved.

Although the fluid pressure attenuating filter of this invention is disclosed for fault-pressure relays for fluid-filled transformer applications, this is by way of example only. The filter of this invention finds application whereever extraneous through-fault pressure waves are to be attenuated.

What is claimed is:

1. A through fault pressure filter for attenuating through fault pressure variations in a fluid media comprising:

a base member having a passage communicating from one end of the base member to another end of the base member; and a stem portion extending from said base member and having a passage communicating with the passage through the base member and a length such that the diameter of the passage and the length of the stem provide an attenuation path for periodic varying pressure disturbances wherein the ratio of the length of the stem to the diameter of the passage ranges from 10 to 1 to 40 to 1 for attenuating periodic pressure disturbances having a frequency range of from 50 to 360 Hz.

2. The filter of claim 1 wherein the base member comprises a disc.

3. The filter of claim 1 wherein the stem member comprises a cylinder.

* * * * *

UNITED STATES PATENT AND TRADEMARK OFFICE

CERTIFICATE OF CORRECTION

PATENT NO. : 4,338,969

DATED : July 13, 1982

INVENTOR(S) : Gerald O. Usry

It is certified that error appears in the above-identified patent and that said Letters Patent is hereby corrected as shown below:

ON THE TITLE PAGE INSERT,

-- (73) Assignee: General Electric Company --.

Signed and Sealed this

*Seventh* Day of *December 1982*

[SEAL]

*Attest:*

GERALD J. MOSSINGHOFF

*Attesting Officer* *Commissioner of Patents and Trademarks*